United States Patent [19]

Gail

[11] 4,078,526
[45] Mar. 14, 1978

[54] ROTARY PISTON ENGINE

[76] Inventor: Josef Gail, Klausenweg 4, Unterwittelsbach, Germany, 8891

[21] Appl. No.: 690,143

[22] Filed: May 26, 1976

[30] Foreign Application Priority Data

| May 31, 1975 | Germany | 2524280 |
| Nov. 25, 1975 | Germany | 2552797 |
| Dec. 31, 1975 | Germany | 2559246 |

[51] Int. Cl.$^2$ .......................................... F02B 53/08
[52] U.S. Cl. ................................. 123/210; 123/216; 123/226; 123/238; 277/26; 418/135
[58] Field of Search ............... 123/8.41, 8.17, 8.19, 123/8.21, 8.23, 8.29, 8.35, 8.39, 44 R; 418/131, 133, 135; 277/26

[56] References Cited

U.S. PATENT DOCUMENTS

| 340,453 | 4/1886 | Nash | 123/8.21 |
| 1,184,650 | 5/1916 | Ingraham | 123/8.41 X |
| 1,549,015 | 8/1925 | McCarthy | 123/8.21 |
| 1,704,236 | 3/1929 | Zuccarello | 123/8.47 X |
| 2,273,754 | 2/1942 | Hand | 123/8.23 |
| 3,015,504 | 2/1962 | Fulton | 277/26 |
| 3,025,087 | 3/1962 | Snow | 277/26 |
| 3,323,499 | 6/1967 | Gisbeis | 418/135 X |
| 3,411,812 | 11/1968 | Prince | 277/26 X |
| 3,695,791 | 10/1972 | Brundage | 418/131 |
| 3,782,340 | 1/1974 | Nam | 123/8.23 |

Primary Examiner—Clarence R. Gordon

[57] ABSTRACT

A rotary piston engine whose two pistons each have one or more sectors of greater radial dimensions sealingly engaging inner walls of two cylindrical, intersecting cavities respectively receiving the pistons, and one or more sectors of smaller radial dimensions which engage the larger sectors in all angular positions of the piston and radially bound working chambers with the inner casing wall. The pistons are coupled for simultaneous rotation of equal angular velocity, and the working chambers expand and contract cyclically because they are circumferentially bounded by the larger piston sectors and by a sealing arrangement connecting the engaged piston portions. A compressor drivingly connected to one of the rotary pistons supplies compressed fluid to the working chamber when it is at its minimum volume, and explosion of the fluid expands the chamber and turns the piston.

16 Claims, 10 Drawing Figures

ROTARY PISTON ENGINE

BACKGROUND OF THE INVENTION

This invention relates to rotary piston engines, and particularly to an improved rotary piston engine in which two inner wall of a casing are of circular cross section about respective spacedly parallel axes and intersect each other to define respective, communicating cavities, two rotary pistons being mounted in the cavities for simultaneous rotation about the axes in opposite respective directions.

A Roots blower is typical of the prior art with the improvement of which this invention is concerned. Each rotor or rotary piston of a Roots blower has at least one first sector and at least one second sector angularly offset from the first sector and of smaller radius. The radially outer circumferential portions of the sectors jointly constitute the circumference of the rotor which extends in a closed loop about the axis of rotation and engages the circumference of the other rotor in all angular rotor positions. During simultaneous rotation of the rotors, the circumferential portion of each first sector sealingly engages the casing wall, and each second sector and the associated wall radially bound a working chamber. The engaged circumferences of the two rotors are virtually sealed to each other. Ports in the casing supply a fluid to be blown and release the conveyed fluid. Roots blowers are commonly employed for conveying gases and liquids, and it has been suggested that they be modified to operate as internal combustion engines. The modified blowers, however, have been found ineffective because they cannot sealingly contain combustion gases under high pressures for a period sufficient to permit the energy stored in the hot gases to be converted to mechanical power.

SUMMARY OF THE INVENTION

It has been found that the sealing problems in a rotary piston engine of the type described can be solved or at least reduced to manageable proportions if the same rotary pistons are not employed both for taking in a fuel mixture or air of combustion at ambient pressure and for compressing the fluid prior to expansion of the ignited mixture or reaction of the compressed air with an injected fuel. According to a basic feature of this invention, the engine is supplied with fluid at a pressure much higher than atmospheric pressure from a compressor drivingly connected to the rotary piston engine which performs only the last two stages of a conventional four stroke cycle. The resulting higher operating pressure of the engine improves volumetric efficiency.

Other features, additional objects, and many of the attendant advantages of this invention will readily be appreciated as the same becomes better understood by reference to the following detailed description of preferred embodiments when considered in connection with the appended drawing.

DETAILED DESCRIPTION

Figure 1:
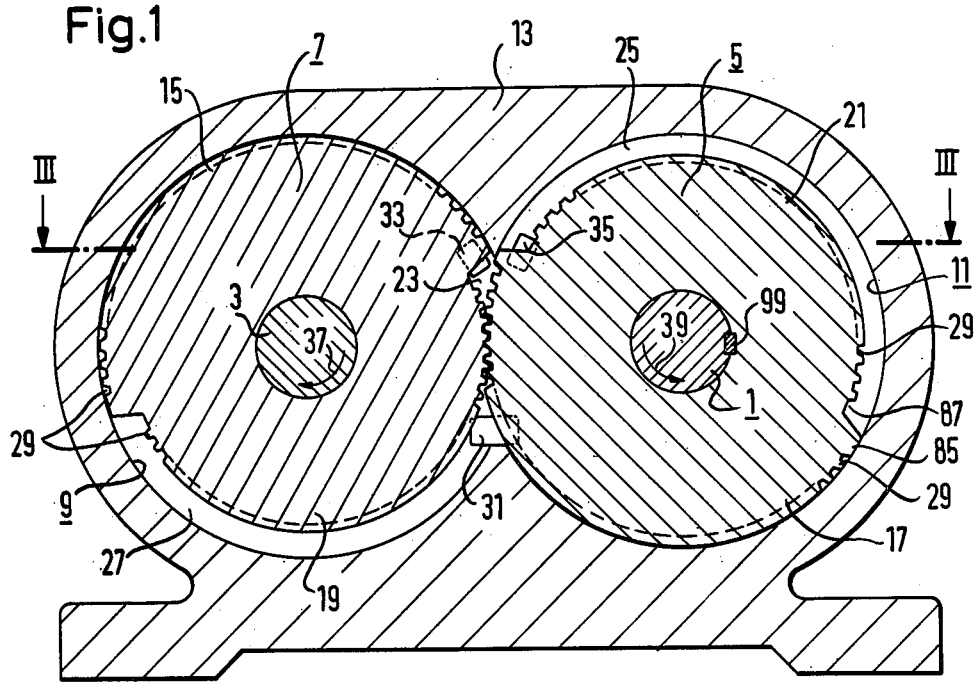
FIG. 1 shows a rotary piston engine of the invention in elevational section on the line I — I in FIG. 3.
Figure 2:
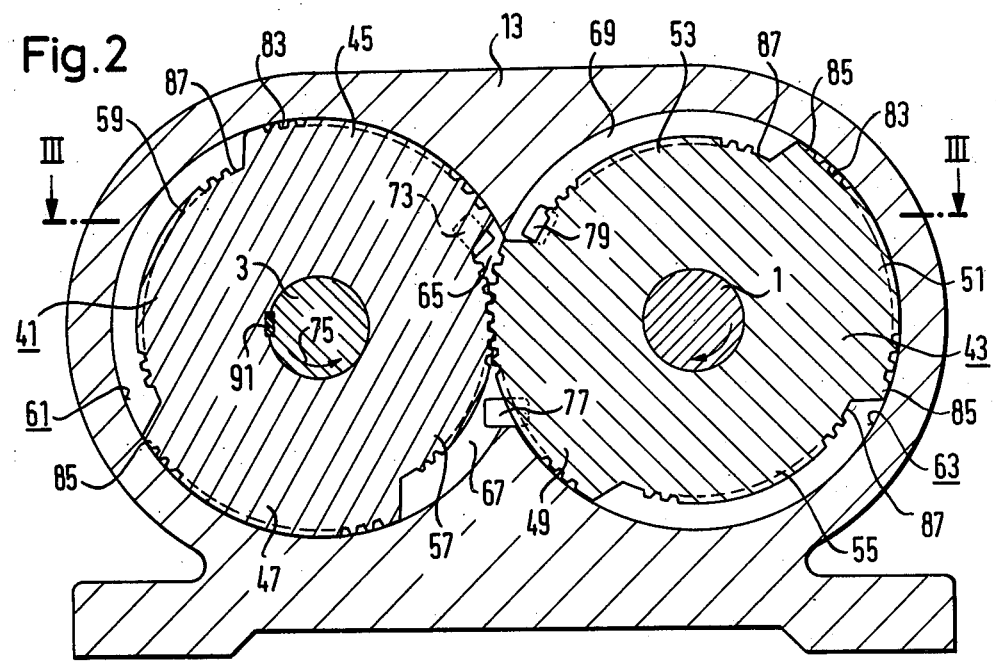
FIG. 2 is a sectional view of the same engine taken on the line II — II in FIG. 3.
Figure 3:
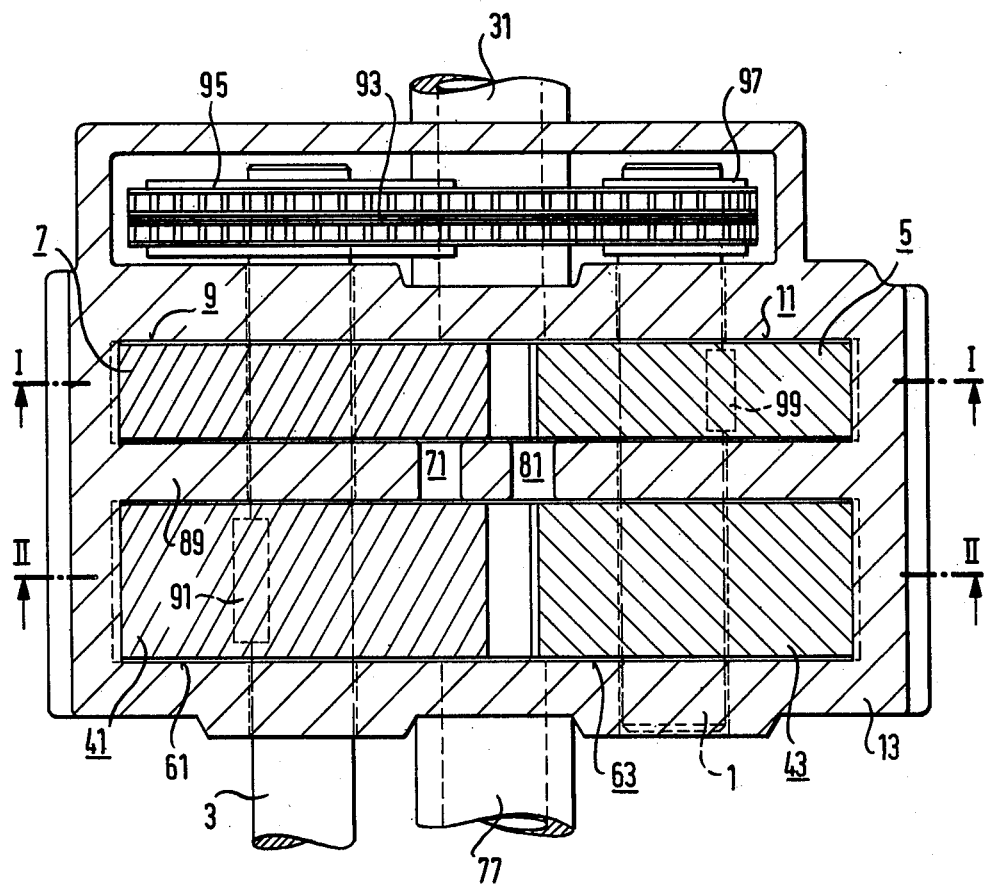
FIG. 3 illustrates the engine of FIGS. 1 and 2 in plan section on the line III — III.

Referring now to the drawing in detail, and initially to FIGS. 1 to 3, there is seen a first engine of the invention which has two closely similar operating stages respectively illustrated in FIGS. 1 and 2 and jointly in FIG. 3. If the engine is operated as an internal combustion engine, the first stage operates as a compressor, the second as a prime mover or motor driving the compressor.

In the compressor stage, two spacedly parallel shafts 1, 3 respectively carry rotors or rotary pistons 5, 7 in intersecting, cylindrical cavities 9, 11 of a common housing or casing 13. The two pistons 5, 7 have respective first sectors 15, 17 of 180° of larger radius and respective second 180° sectors 19, 21 of smaller radius. The toothed circumferences 29 of the larger sectors sealingly engage the internal walls of the respective cavities 9, 11, while the smaller sectors and the associated cavity walls radially bound working compartments or chambers 25, 27 therebetween, another working chamber 23 being bounded partly by the circumferences of the pistons 5, 7 in the position of the pistons seen in FIG. 1. Although the pitch diameters of the toothed circumferences are different in the smaller and larger sectors, the circumferential spacing of the teeth is uniform and but a very small fraction of the radius of the smaller sectors. The relative angular position of the shafts 1, 3 is such that the circumference 29 of one of the smaller sectors 19, 21 meshingly engages the circumference of one of the larger sectors 15, 17 in all angular positions of the shafts.

A common supply port 31 in the intersecting portion of the two cavities 9, 11 alternatingly communicates with the chambers 25, 27, and two discharge ports 33, 35 are offset a small distance from the intersecting portion inward of the cavities 9, 11 in a direction opposite to the direction of piston rotation indicated in FIG. 1 by arcuate arrows 37, 39. The supply port 31 thus is open toward the chambers 25, 27 while the same expand, and the discharge ports 33, 35 respectively communicate with the two cavities during their contraction. The ports 33, 35 are opened and closed in proper sequence by the larger sectors 15, 17.

The motor stage shown in FIG. 2 has rotary pistons 41, 43 which differ from the afore-described rotors 1, 3 by having each two first or larger toothed sectors 45, 57; 49, 51 meshing with second or smaller sectors 53, 55; 57, 59, the angular length of each sector being 90°. The pistons 41, 43 respectively are mounted on the shafts 1, 3 in cylindrical cavities 61, 63 of the casing 13 and bound with the cavity walls and with each other two chambers 67, two chambers 69, and one chamber 65, the latter being shown at the beginning of its communication with an intake port 73 which is in the process of being cleared by the first sector 45 of the piston 41 and which communicates with the discharge port 33 of the compressor stage through a conduit 71 (FIG. 3).

If the supply port 31 of the compressor stage is connected to a carburetor, the mixture of fuel and air of combustion compressed in the first stage enters the chamber 65 when the latter is near its minimum capacity and immediately before the conduit 71 is sealed by the sector 15 of the piston 9 in the position of the compressor stage illustrated in FIG. 1. A non-illustrated spark plug may then ignite the compressed mixture in the chamber 65 which expands in the power stroke of the motor stage. Similarly, an explosion may occur in the chamber 65 when the compressor stage receives only air through the intake port 31, and a fuel is injected into the chamber 65 in a manner not shown, but conventional in itself. Similarly, a fluid mixture compressed in the chamber 25 is permitted to enter the associated chamber in the motor stage only after the sector 49 of the rotary piston 51 clears an intake port 79 in the cavity 63 connected to the discharge port 35 of the compressor stage by a conduit 81.

The pistons 41, 43 rotate jointly in opposite directions as indicated by the arrow 75 in a cycle in which each chamber receives fuel mixture or air in the compressed condition from the compressor stage, expands in a power stroke, and ultimately contracts while communicating with an exhaust port 77 common to the two cavities where they intersect each other to expel the spent combustion mixture. There are four power strokes during each revolution of the coupled pistons 41, 43.

A circumferential rim of teeth 83 seals each of the first sectors 45, 47, 49, 51 to the inner casing wall when not engaged by corresponding teeth of the smaller or second sectors of the other rotary piston. To impede circumferential flow of fluid between adjacent chambers, the first and last tooth 85 of each first sector is circumferentially enlarged and meshes with a correspondingly enlarged recess 87 adjacent the first and last teeth on the second sectors 53, 55, 57, 59.

As is best seen in FIG. 3, the cavities 61, 63 of the motor stage are separated axially from the corresponding cavities 9, 11 of the compressor stage by a partition 89. The piston 41 is secured against rotation on the shaft 3 by a spline 91. A link chain 93 couples sprockets 95, 97 respectively fixedly fastened to the shafts 3, 1, and the piston 5 is secured on the shaft 1 by a spline 99. The pitch diameter of the sprocket 95 is twice that of the sprocket 97 so that the rotors or pistons 5, 7 rotate at twice the speed of the pistons 41, 43. The shaft 3 axially projects from the casing 13 as the output shaft of the illustrated engine when operating as an internal combustion engine or as a drive shaft for the apparatus when operating as a pump. The pistons 7, 43 are rotatably mounted on the supporting shafts and turn in respective directions opposite to the directions of rotation of the associated shafts. This arrangement permits the conduits 71, 81 to be short, straight, and parallel to the shafts 1, 3, as is evident from FIG. 3.

Figure 4:
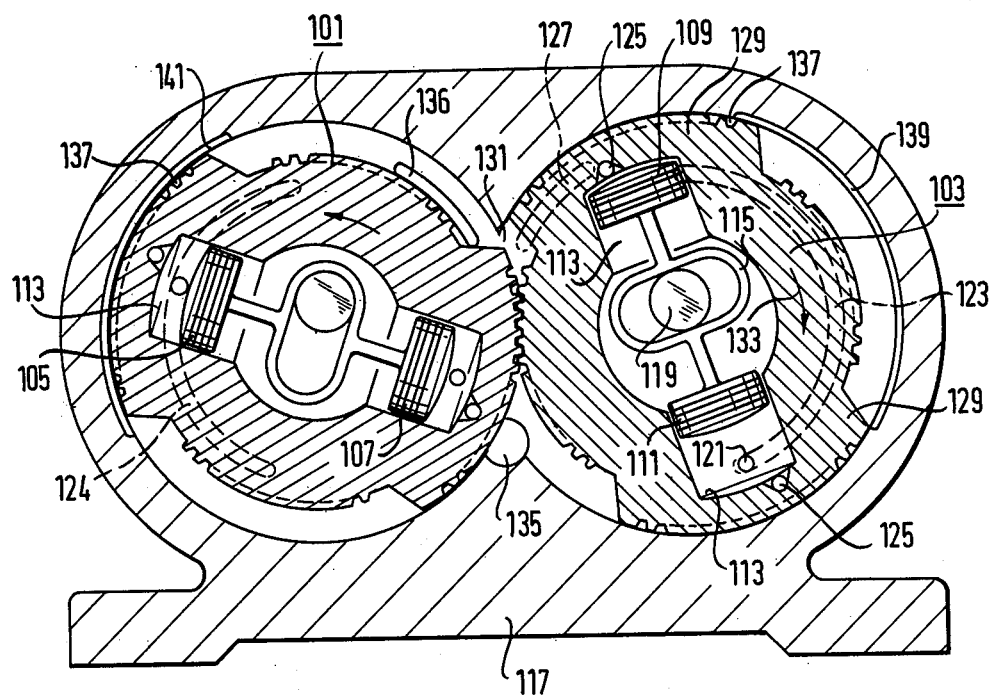
FIG. 4 shows another engine of the invention in a view corresponding to that of FIG. 1.

In the modified engine of the invention shown in FIG. 4, respective elements of a compressor stage and of a motor stage are installed in common cavities of a casing or housing. The motor stage has two rotary pistons 101, 103 which are not significantly different in appearance from the pistons 41, 43 described above when viewed in any radial direction. Two reciprocating pistons 105, 107; 109, 111 are received in respective cylinder cavities 113 within the pistons 101, 103. The two cylinder cavities in each rotary piston have a common axis in a plane which is perpendicular to the axis of rotation. The aligned piston rods of the two reciprocating pistons in each rotary piston are connected by a guide frame 115 elongated in the afore-mentioned radial plane at right angles to the direction of reciprocating piston movement.

The casing 117 in whose intersecting, cylindrical cavities the rotary pistons 101, 103 are rotatably mounted carries two eccentric pins 119 of circular cross section which axially project into the frames 115 respectively and thus cause the pistons 105, 107, 109, 111 to reciprocate in the associated cylinder cavities 113 when the pistons 101, 103 rotate.

Axial bores 121 in the pistons 101, 103 lead out of each cavity 113 and communicate with circumferntially elongated, circularly arcuate suction slots 123, 124 in the casing 117 during the suction stroke of the associated reciprocating cylinder. Axial passages 125 open toward respective cavities 113 at the transverse end walls of the latter communicate with circumferentially elongated transfer chambers or recesses 127, 136 in the radial, inner walls of the casing 117 during the compression stroke of each reciprocating piston. The transfer chambers 127, 136 are sealed by the first or radially larger sectors 129 of the rotary pistons 101, 103 while connected to the cylinder cavities 113, and discharge their contents of compressed fluid into the working chambers normally bounded by the second sectors of the pistons 101, 103 and the inner cylindrical cavity walls of the casing when the working chambers reach their smallest volume or capacity as is shown at 131 in FIG. 4 and are ready to receive a combustible fuel mixture for ignition by a spark plug omitted from the showing of FIG. 4.

The exploding fuel mixture causes expansion of the chamber 131 and rotation of the piston 103 as indicated by the arrow 133. The spent fuel mixture is eventually discharged through an exhaust port 135 as described with reference to FIG. 2. Some of the compressed combustion gases are trapped in the gaps 137 between the circumferential teeth on the first sectors 129. They are released into shallow, circumferentially elongated recesses 139, 141 in the otherwise cylindrical inner walls of the casing 117 for recovery of their energy, the recesses 139, 141 being provided in a wall portion of each casing cavity farthest from the rotary piston in the other cavity.

Figure 5:
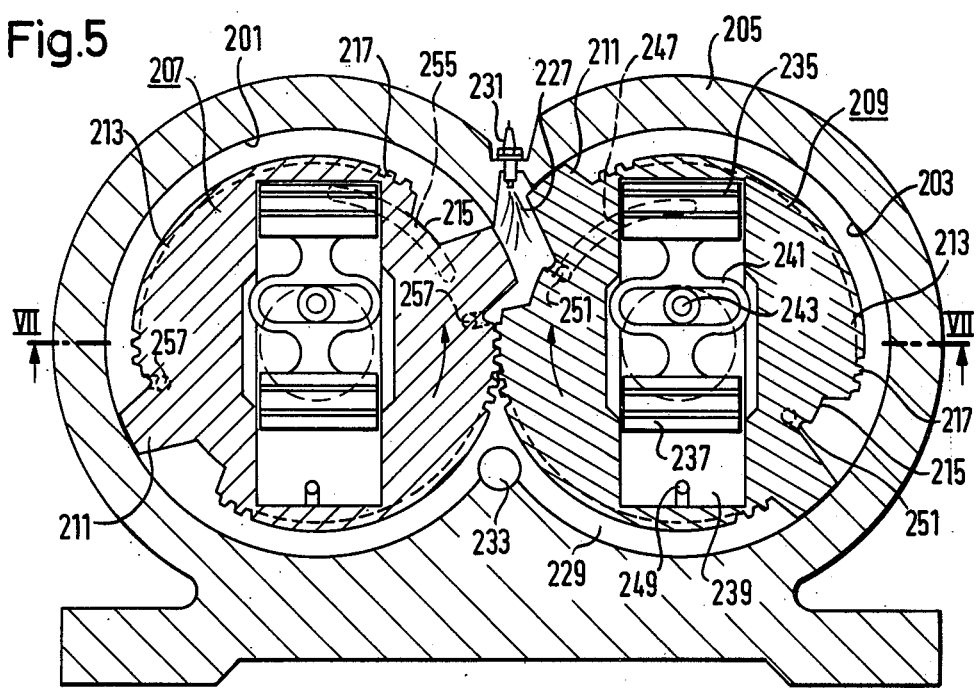
FIG. 5 illustrates a rotary piston internal combustion engine of the invention in elevational section.
Figure 6:
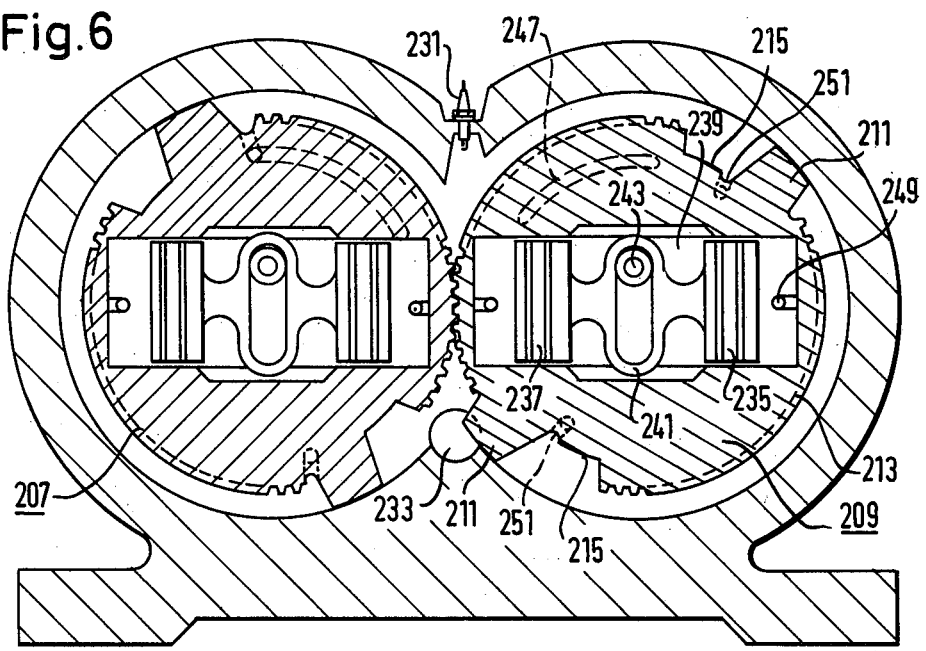
FIG. 6 shows the engine of FIG. 5 in another operative position.
Figure 7:
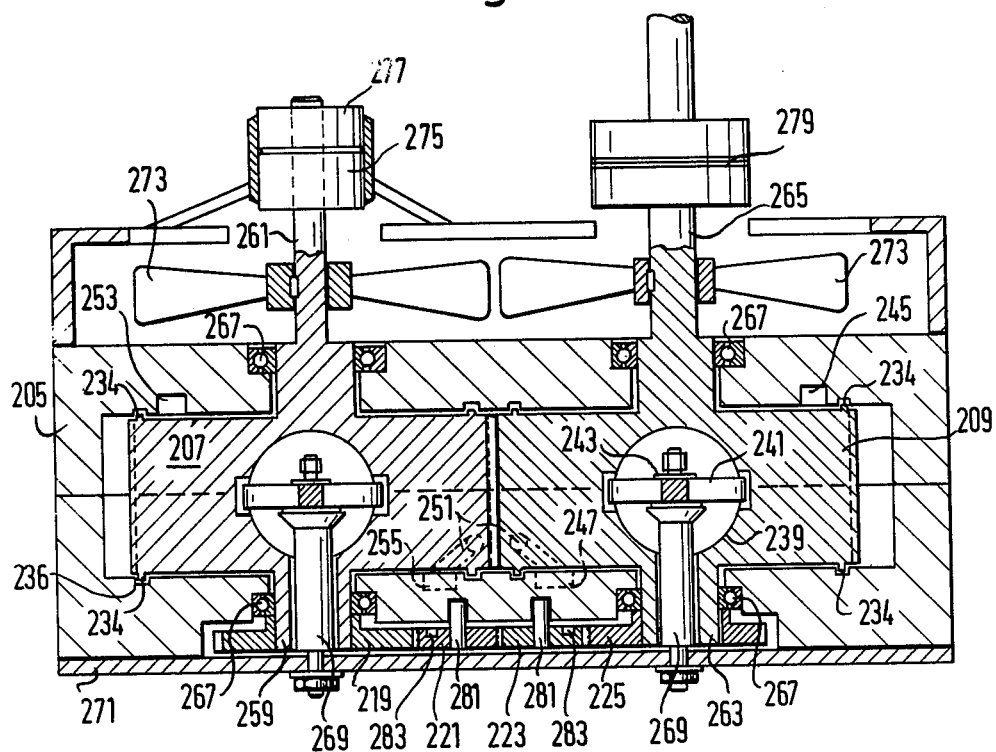
FIG. 7 is a plan section of the engine of FIG. 5 taken on the line VII — VII.

The apparatus of the invention shown in FIGS. 5 to 7 is similar to that described above with reference to FIG. 4 in that the compressor and motor stages are confined in common cavities 201, 203 of a casing 205. Two rotary pistons 207, 209 are respectively received in the two cavities for rotation about the spacedly parallel axes of the cylindrical, inner casing walls which radially bound the cavities. Each piston 207, 209 has three pairs of angularly offset sectors whose outer circumferential portions jointly constitute the circumference of the piston. Each circumference is radially engaged at all times with the circumference of the other piston. Each radially largest sector 211 engages a radially smallest sector 215 on the other piston during rotation of the pistons 207, 209 whereas the circumferentially longest sectors 213 of intermediate radial dimensions have gear teeth 217 which may be meshed in sealing engagement.

As is best seen in FIG. 7, the rotary pistons 207, 209 are coupled to each other for simultaneous movement in opposite direction at equal angular velocity not only by the engaged teeth 217, but also by a train of four gears 219, 221, 223, 225. The sectors 215 are shaped for smooth engagement with the sectors 211 regardless of the difference in their circumferential velocities. Each sector 211 sealingly engages the cylindrical wall of one of the cavities 201, 203 during more than three quarters of each piston revolution and thereby circumferentially bounds working chambers 227, 229 which are bounded in a radially inward direction by the sectors 213, 215 and in a radially outward direction by inner casing walls. The capacity or volume of the chambers varies cyclically between a maximum and a minimum value during rotation of the pistons 207, 209. A spark plug 231, implied but not illustrated in FIGS. 1 – 4, projects into the chamber 227 for igniting the contents of the chamber in the piston position illustrated in FIG. 5.

The exploding fuel mixture turns the coupled pistons 207, 209 in opposite directions toward the position shown in FIG. 6 and beyond to be ultimately discharged through an exhaust port 233 as described above. Premature leakage of combustion gases along the casing walls toward the exhaust port 233 is held to a minimum by two sectors 211 sequentially interposed in each circumferential direction between the combustion space and the port 233 while the gas pressure is high, leakage through the meshingly engaged teeth of the intermediate sections 213 being negligible at all times. As is shown in FIG. 7, sealing rings 234 interposed between respective radial faces of the pistons 207, 209 and radial walls of the cavities 201, 203 block a radial path of escape for the combustion gases. The rings 234 are biased toward grooves 236 in the cavity walls by weak springs, not shown and conventional in themselves.

Before entering the cavities 201, 203, the fuel mixture is compressed by devices closely similar to those described with reference to FIG. 4. A pair of double-acting, reciprocating pistons 235, 237 are received in a cylinder cavity 239 within each rotary piston 207, 209, and their piston rods are connected by a guide frame 241 receiving an eccentric pin 243 so that each reciprocating piston travels in an approximately circular, eccentric path about the axis of rotation of the associated rotary piston. Each reciprocating piston performs a suction stroke and a compression stroke during each revolution of the associated rotary piston.

Openings in the wall of the cylinder cavity 239 in the piston 209, not explicitly shown in FIGS. 5 to 7, but closely analogous to the bores 121 seen in FIG. 4, receive fuel mixture during each suction stroke from a suction slot 245 in the casing 205, as is best seen in FIG. 7. A transfer chamber 247 is provided in the radial wall of the casing 205 opposite the suction slot 245 to receive compressed fuel mixture from a passage 249 communicating with the cylinder cavity 239. Ducts 251 are provided in the rotary piston 209 to lead the compressed fuel mixture from the transfer chamber 247 to the working chamber 227 in the piston position of FIG. 5.

As is best seen in FIG. 7, a semi-circular suction slot 253, a transfer chamber 255 and ducts 257 (FIG. 5) are associated with the piston 207 as described above with reference to the piston 209. The ignition system is timed to energize the spark plug 231 when both transfer chambers 247, 255 communicate with the chamber 227. If the engine operates in the Diesel cycle, fuel may be injected into the transfer chambers 247, 255 and ignition started there without a spark plug, only air being compressed in the cylinder cavities 239.

Coaxial shafts 259, 261 project in opposite directions from the rotary piston 207, and coaxial shafts 263, 265 are fixedly and similarly fastened to the piston 209. The shafts are journaled in ball bearings 267 in the casing 205. The shafts 259, 263 are hollow and receive fastening pins 269 for the eccentric guide pins 243. The fastening pins 269 are fixedly attached to a cover portion 271 of the casing 205. The shafts 261, 265 project from the casing 205 and carry axial blowers 273 for cooling the engine. Both shafts 261, 265 may be used as output shafts of the engine. In the illustrated embodiment, the shaft 261 drives a generator 275 and a distributor 277 of the ignition system, and may carry a fuel injection pump if the engine is operated as a Diesel motor. The shaft 265 is connected to a driven load, such as the wheels of a vehicle, by a friction clutch 279, conventional and not shown in detail.

The motion transmitting train constituted by the gears 219, 221, 223, 225 compensates for out-of-balance forces exerted on the engine shafts by the rotary pistons 207, 209. Since each piston performs two power strokes per revolution, the pitch diameter of the two inner gears 221, 223 mounted on the casing 205 by means of stub shafts 281 is one half of the pitch diameter of the gears 219, 225 mounted on the shafts 259, 263, and eccentric recesses 283 are formed in the smaller gears for compensation of the uneven piston load.

Figure 8:
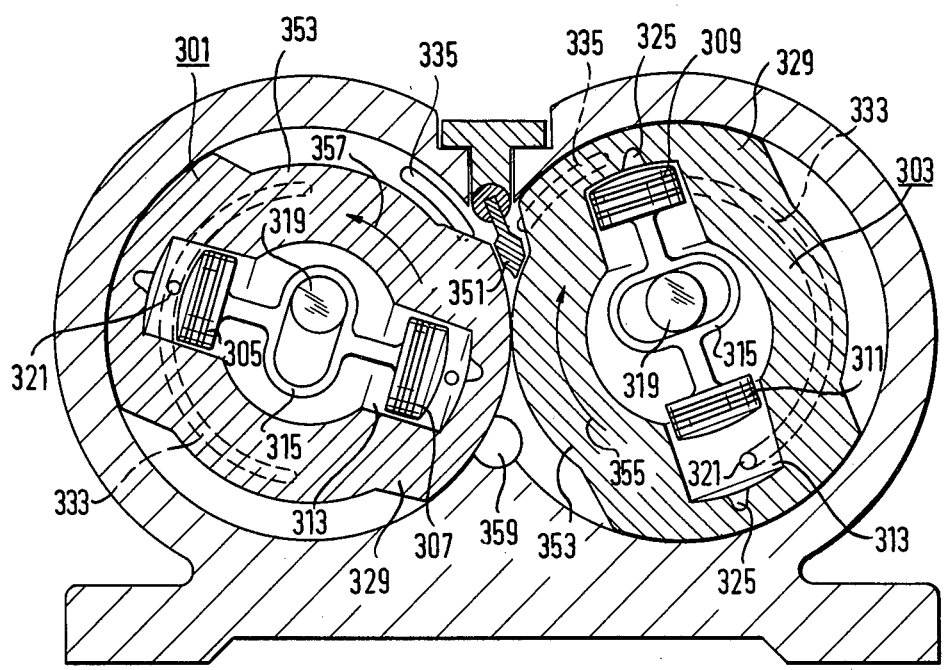
FIG. 8 shows a further rotary piston engine of the invention in elevational section.

The engine of the invention illustrated in FIG. 8 is closely similar to that shown in FIG. 4, but lacks the meshingly engageable teeth on the circumferential portions of the first and second rotary piston sections. For proper synchronization and movement at equal angular velocity, the two rotary pistons 301, 303 are coupled by a non-illustrated gear train substantially identical with that shown in FIG. 7.

Reciprocating pistons 305, 307, 309, 311 are received in cylinder cavities 313 of the rotary pistons 301, 303, and the aligned piston rods of the two pistons reciprocating in each rotary piston are connected by a guide frame 315, the casing of the engine carrying eccentric guide pins 319 received in the frames 315. The cylinder cavities 313 receive fresh fuel mixture from suction slots 333 in the casing 317 through axial bores 321 in the rotary pistons, and axial passages 325 lead the compressed mixture into transfer chambers 335 in the radial, inner walls of the rotary pistons, all as described in more detail with reference to FIG. 4.

The radially larger, first sectors 329 of the rotary pistons make contact with the inner cylindrical walls of the casing 317 over areas sufficiently wide in a circumferential direction to ensure a tight seal, but the first sector 329 of each rotary piston 301, 303 makes only virtual line contact with the radially smaller, second section 353 of the other piston during rotation of the pistons in the direction of the arrows 355, 357, and additional sealing is provided by a vane 351 which prevents premature escape of compressed gases toward an exhaust port 359.

Figure 9:
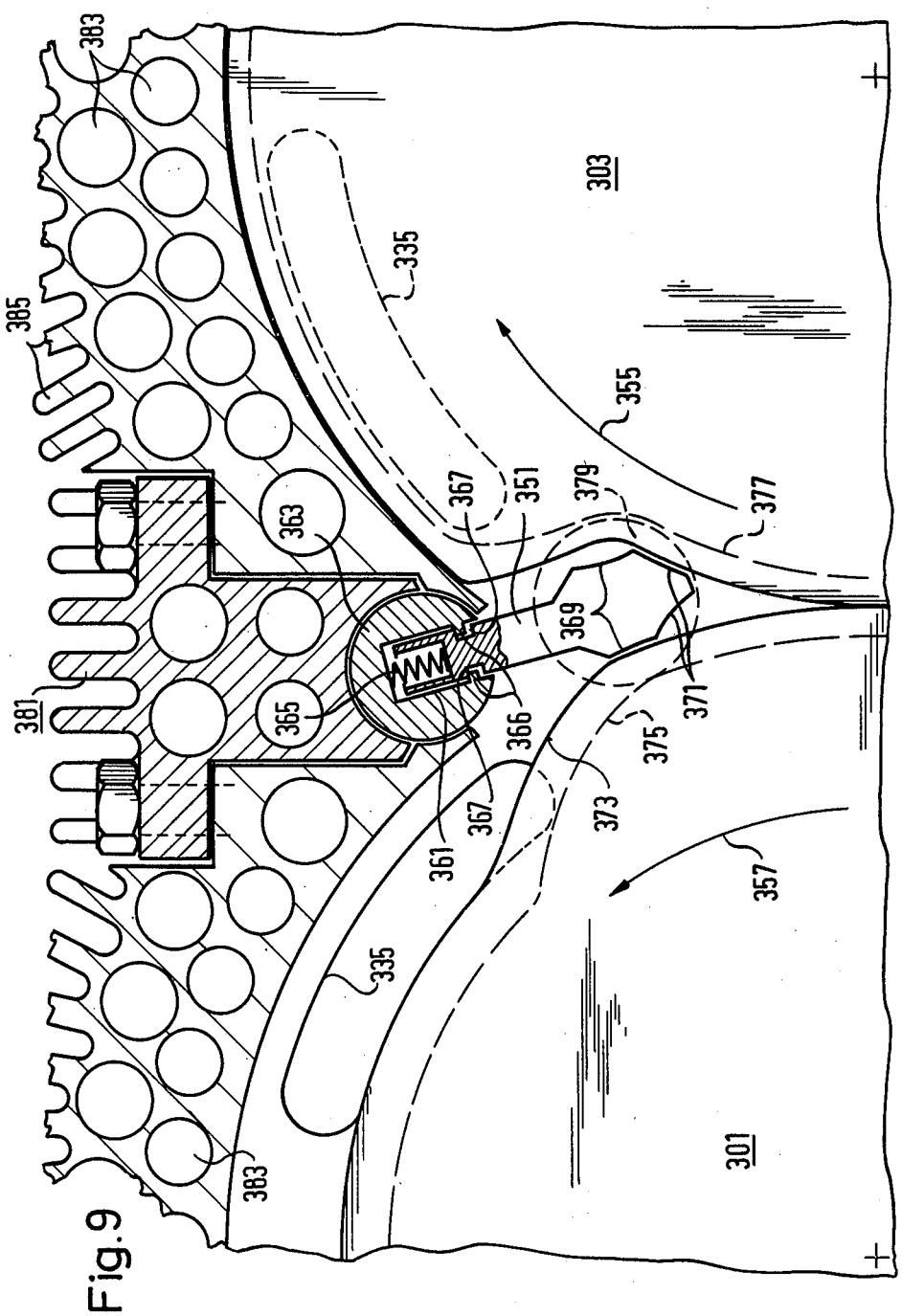
FIG. 9 is a fragmentary, enlarged view of the engine of FIG. 8.

As is better seen in FIG. 9, the vane 351 is received in a radial slot 361 of a pivot pin 363 whose axis is parallel to the axes of rotation of the rotary pistons 301, 303, and is biased outward of the slot by helical compression springs 365 distributed along the axial length of the pin 363, only one spring being visible in FIG. 9. Projections 366 on the pin engaging recesses 367 in the vane 351 limit the radially outward movement of the vane 351 from the slot 361. The free edge portion of the vane 351, which is elongated at right angles to the plane of FIG.

9 and of uniform cross section over its entire length, has two pairs of cylindrically arcuate sealing faces 369, 371 shaped for conforming engagement with the circumferential faces of the first sectors 329 and the second sectors 353 respectively under the pressure of the springs 365.

The pivot pin 363 is moved about its axis as the vane 351 travels over the oblique ramps 373 connecting the cylindrically arcuate outer faces of the first and second sectors 329, 353. Further guidance for the vane 351 is provided by radial cams 375, 377 fastened to the non-illustrated shafts of the rotary pistons 301, 303, and by a cam follower roller 379 moving over the cam faces and connected with the pivot pin 363 by radial arms, not shown.

The pin 363 is journaled between bearing faces of the main portion of the casing 317 and of a plug 381 set into an opening of the casing 317 where the walls of the two cylindrical cavities in the casing intersect each other. The vane 351 needs to be replaced from time to time because of frictional wear, and is readily withdrawn after removal of the bolted plug 381.

As is not specifically shown in other Figures of the drawing, the several engine casings of the invention are provided with cooling water channels 383 and preferably also with external ribs 385 for cooling by blower propelled air, as has been shown in FIG. 7.

The vane 351 is fully equivalent in its sealing effect to the meshing teeth on the rotary pistons shown in FIG. 4, and the apparatus shown in FIGS. 8 and 9 operates as described above with reference to FIG. 4. Similarly, the pistons reciprocating in the cylinder cavities of the rotary pistons 301, 303 are functionally equivalent to the rotary compressor arrangement shown in FIGS. 1 - 3, and the two types of compressor stages are interchangeable in an obvious manner in all embodiments of the invention shown and described.

Figure 10:
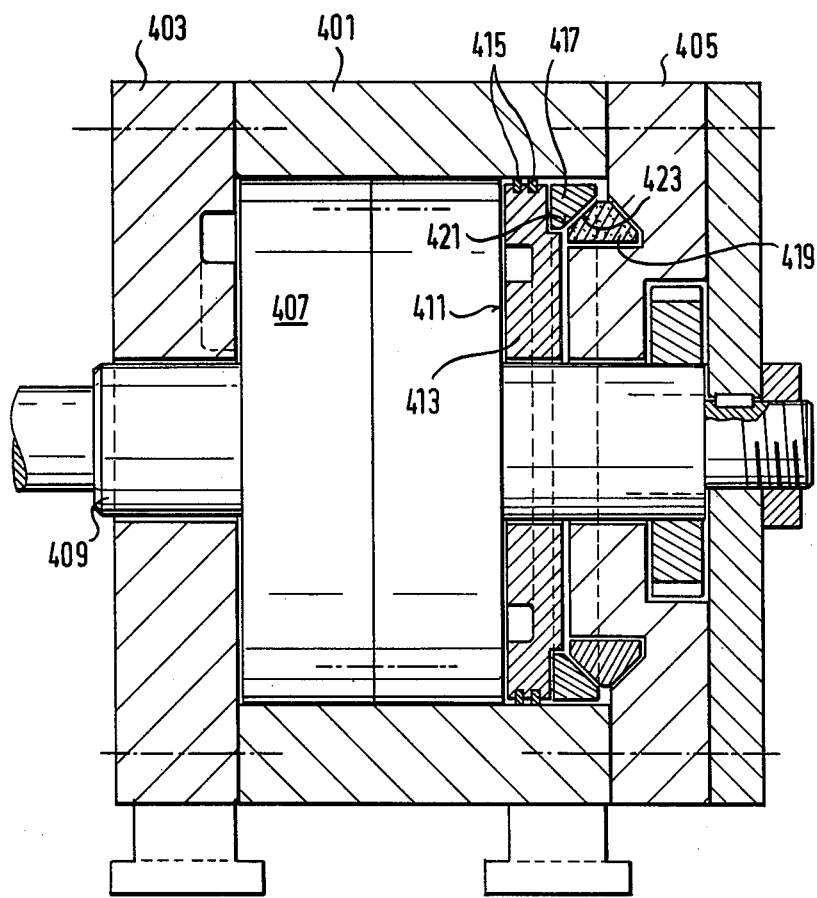
FIG. 10 shows an engine of the invention in elevational section on the axis of rotation of one of its shafts.

Another feature of this invention equally applicable to all embodiments is shown in FIG. 10. As the casings of all engines of this invention, though not always specifically shown, the casing illustrated in FIG. 10 has a body portion 401 whose inner face has two cylindrically arcuate, intersecting portions radially defining respective communicating cavities as is not shown in FIG. 10, but amply illustrated in the other Figures of the drawing.

The cavities are axially closed by cover plates 403, 405 and enclose rotary pistons 407 of which only one is shown in the drawing. The piston 407 is mounted on a shaft 409 which is journaled in the cover plates 403, 405 and movably passes through a wall element 413 axially interposed between a radial face 411 of the piston 407 and the cover plate 405. The narrow, circumferential edge of the element 413 conforms to the arcuate inner face of the body portion 401 and is axially movably sealed to the body portion by piston rings 415.

The wall element 413 carries a positioning ring 417 of aluminum alloy coaxial with the shaft 409 and having an inner, concavely conical face 421 flaring toward the cover plate 405. An annular shoulder of the cover plate 405 carries another positioning ring 419 of porcelain having an outer, convexly conical face 423 conformingly engaging the face 421 of the ring 417.

When the engine is cold, the axial dimension of the rotary piston 407 is at its minimum value, as is the diameter of the aluminum ring 417. Camming engagement of the conical faces 421, 423 holds the wall element 413 axially in sealing engagement with the radial piston face 411. As the engine warms up, the piston 407 expands, and so does the aluminum ring 417. The ceramic ring 419 has a coefficient of thermal expansion which is negligible as compared to that of the aluminum ring 417, and the wall element 413 can be shifted toward the cover plate 405 by the expanding piston 407 while maintaining sealing engagement with the piston face 411.

In the absence of the thermal compensation provided by the movable wall element 413 and the associated rings 417, 419, a narrow gap would open axially between the radial face 411 of the rotary piston 407 and the opposite inner face of the casing in the cold engine and would permit sufficient fuel mixture and/or combustion gases to reach the exhaust port prematurely to make starting of the engine difficult. Leakage along curved interfaces of pistons and casing in cold engines of the invention has been found to be much less troublesome than leakage between faces which are planar or nearly so.

Other materials having greatly different expansion coefficients may be substituted for the porcelain and aluminum alloy referred. Thus, other ceramic materials or invar may be used for the convexly conical ring, and cooperate successfully with many different metals in the concavely conical ring 417. The ring materials are readily chosen to match the dimensions and materials of construction of the engine, particularly of the rotary pistons.

The compressor arrangements shown in FIGS. 4 to 9 are preferred over the rotary compressor arrangement of FIGS. 1 - 3 where space is limited, and were the conduits connecting the compressor to the intake port of the motor stage should be as short as possible.

The compression ratio in an engine of the type under consideration is directly related under otherwise unchanged conditions to the number of sectors on each rotary piston. For this reason, the rotors or rotary pistons of the compressor stage shown in FIGS. 1 - 3 have each one sector of each size while the associated motor stage has two first and two second sectors on each rotary piston, and the two stages are coupled for rotation at a speed ratio of 1:2 for proper synchronization.

When a fluid is compressed by reciprocating pistons within each rotary piston, as is shown in FIGS. 4 to 9, the fluid entering the compressor stage at ambient temperature and pressure aids in reducing the operating temperature of the engine.

When the two rotary pistons of the engine are coupled to each other by external gears, wear of the circumferential surfaces of the rotary pistons is significantly reduced. Continuously engaged gear rims on the circumferences of the pistons have a similar effect and additionally minimize leakage between their engaged teeth.

The rotary pistons having sectors of three different radial dimensions, as shown in FIGS. 5 - 7, tend to suppress vibrations which are sometimes encountered in engines of the invention having pistons of small diameter provided with only two different sector types and operating at very high rotary speeds.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the appended claims.

What is claimed is:

1. A rotary piston engine comprising:
   (a) a casing having two inner walls of circular section about respective, spacedly parallel axes, said walls intersecting each other and defining respective, communicating cavities;
   (b) two rotary pistons respectively mounted in said cavities for simultaneous rotation about said axes in opposite respective directions,
      (1) each piston having at least one first sector and at least one second sector angularly offset from said first sector and of smaller radius than said first sector,
      (2) each sector having a radially outer, circumferential portion, said circumferential portions jointly constituting the circumference of said piston,
      (3) said circumference extending in a closed loop about the axis of rotation of said piston and engaging the circumference of the other piston in all angular positions of said pistons,
      (4) the circumferential portion of each first sector sealingly engaging the associated wall, and the circumferential portion of each second sector and the associated wall radially bounding a working chamber during said rotation,
      (5) sealing means interposed between the engaged circumferences of said pistons in substantially fixed spatial relationship to said casing, said sealing means and said first sector circumferentially bounding said working chamber during said rotation, whereby said working chamber alternatively expands and contracts,
      (6) said casing being formed with a plurality of ports having respective orifices alternatingly communicating with said working chamber and swept by said first sectors in sealing cooperation during said rotation of said pistons;
   (c) a compressor drivingly connected to one of said pistons and communicating with at least one of said ports for supplying a compressed fluid to said working chambers, said compressor including
      (1) a piston member, one of said rotary pistons being formed with a cylinder cavity therein,
      (2) cooperating guide means on said casing and on said one rotary piston for reciprocating said piston member in said cylinder cavity relative to said one rotary piston in alternating suction and compression strokes in response to rotation of the latter;
   (d) supply means for supplying to said cylinder cavity a fluid to be compressed by the reciprocating piston member;
   (e) a discharge conduit connecting said cavity to one of said ports for discharge of the compressed fluid; and
   (f) an output member connected to one of said pistons for joint rotation and accessible outside said casing.

2. An engine as set forth in claim 1, wherein said guide means include means for guiding said piston member in an approximately circular path eccentric relative to the axis of rotation of said one rotary piston during said rotation of the latter.

3. An engine as set forth in claim 2, wherein said guide means include a pin member fixedly fastened to said casing, and a frame member movably receiving said pin member therein and fixedly fastened to said piston member.

4. An engine as set forth in claim 1, wherein said one rotary piston has a radially extending wall formed with a supply slot elongated in an arc about the axis of rotation of said one rotary piston, said one rotary piston being formed with a bore connecting said cylinder cavity to said slot during a suction stroke of said piston member, said radially extending wall being further formed with a transfer chamber open toward the cavity receiving said one rotary piston and swept by said first sector in sealing engagement during said rotation of the one rotary piston, said one rotary piston being formed with a passage communicating with said transfer chamber during a compression stroke of said reciprocating piston member and being released by said first sector for communication with said working chamber when said working chamber is contracted to a volume near the minimum volume thereof.

5. An engine as set forth in claim 1, further comprising coupling means connecting said rotary pistons for said simultaneous rotation at equal angular velocity.

6. An engine as set forth in claim 5, wherein said coupling means include respective gear members connected to said rotary pistons for joint rotation, and motion transmitting means connecting said gear members for simultaneous rotation.

7. An engine as set forth in claim 6, wherein said motion transmitting means include two additional, meshingly engaged gear members of smaller pitch diameter than the gear members connected to said rotary piston and meshingly interposed therebetween, said additional gear members being mounted for rotation about respective axes and having respective centers of gravity offset from the respective axes of rotation for compensating out-of-balance forces exerted on the connected gear members by said rotary pistons.

8. An engine as set forth in claim 5, wherein said coupling means include alternating teeth and gaps on said circumferential portions of said first and second sectors meshingly engaging each other during said rotation of said rotary pistons.

9. An engine as set forth in claim 8, wherein the teeth on said first sectors engage the associated wall during a portion of each revolution of said rotary pistons, said wall being formed with a shallow recess communicating with the gaps between the teeth of the associated rotary piston during another portion of said revolution, said recess being circumferentially remote from the other rotary piston.

10. An engine as set forth in claim 1, further comprising igniting means on said casing spacedly adjacent said sealing means for igniting a fluid in said working chamber when said chamber is contracted substantially to the smallest volume thereof, said rotary pistons having each a third sector angularly interposed between said first and second sectors and having a circumferential portion of a radius intermediate in magnitude between the radii of said first and second sectors, said sealing means including teeth on the circumferential portions of said third sectors meshing with each other during rotation of said rotary pistons.

11. An engine as set forth in claim 1, wherein said inner walls are substantially cylindrical and said circumferential portions of said sectors have cylindrically arcuate faces extending over substantially the entire angular length of each sector, said sealing means including a vane member pivotally mounted on said casing for simultaneous sealing engagement with said faces.

12. An engine as set forth in claim 11, further including a pivot pin mounted on said casing for angular movement about a pivot axis parallel to said spacedly parallel axes, said pin being formed with a slot, said vane member being partly received in said slot for radial movement relative to said pivot axis, and yieldably resilient means biasing said vane member outward of said slot toward said faces.

13. An engine as set forth in claim 12, further comprising cooperating cam means on one of said rotary pistons and on said pivot pin for controlling pivoting movement of said vane member.

14. An engine as set forth in claim 1, further comprising a wall member in one of said cavities, said wall member extending radially relative to said parallel axes and being mounted for axial movement, one of said rotary pistons having a radial face axially opposite said wall member, and temperature responsive means for shifting said wall member axially toward said one rotary piston when the temperature of said casing and of said one rotary piston decreases and for permitting movement of said wall member away from said one rotary piston when the temperature of said casing and of said one rotary piston increases sufficiently to cause axial, thermal expansion of said one rotary piston.

15. An engine as set forth in claim 14, wherein said temperature responsive means include two coaxial ring members respectively fastened to said casing and to said wall member, said ring members having respective, engaged, concavely and convexly tapering annular faces, the materials of construction of said ring members differing in their coefficients of thermal expansion.

16. An engine as set forth in claim 12, further including a plug member mounted on said casing, said plug member forming a construction unit along with said pivot pin and said vane member, said construction unit being removable from outside of said casing.

* * * * *